United States Patent [19]
Hahn et al.

[11] 4,398,693
[45] Aug. 16, 1983

[54] MOLD HALF FOR LAMINATED PARTS

[75] Inventors: Michael Hahn; Peter Wackerle, both of Ottobrunn; Peter Eschenfelder, Faistenhaar; Ralf-Thilo Schulz, Putzbrunn, all of Fed. Rep. of Germany

[73] Assignee: Messerschmitt-Bölkow - Blohm Gesellschaft mit Beschrankter Haftung, Munich, Fed. Rep. of Germany

[21] Appl. No.: 212,194

[22] Filed: Dec. 2, 1980

[30] Foreign Application Priority Data

Dec. 4, 1979 [DE] Fed. Rep. of Germany ....... 2948690

[51] Int. Cl.³ .......................... B28B 7/02; B41B 11/60
[52] U.S. Cl. ........................................ 249/155; 249/33
[58] Field of Search .......................... 249/155, 33, 159; 158/580

[56] References Cited

U.S. PATENT DOCUMENTS

| 2,410,888 | 11/1946 | Lucy | 249/155 |
| 2,616,148 | 11/1952 | Hawes | 249/33 |
| 2,793,720 | 5/1957 | Hawes | 249/155 |
| 3,741,515 | 6/1973 | Rice | 249/159 |
| 4,118,004 | 10/1978 | Scott | 249/159 |

FOREIGN PATENT DOCUMENTS

| 2650859 | 2/1979 | Fed. Rep. of Germany . |
| 1425312 | 2/1976 | United Kingdom ................ 249/155 |

Primary Examiner—Jerome W. Massie
Attorney, Agent, or Firm—Toren, McGeady and Stanger P.C.

[57] ABSTRACT

A mold half is provided particularly for laminated parts which are to be molded from fiber components, with the mold half being formed with an inside surface matching the negative contour of the part to be molded therein. The mold half is formed of a shaped plate material which has been plastically deformed along deformation lines at angles determined by the shape of the part to be molded. The mold half is affixed upon a support member which fits the shape of the deformed material.

2 Claims, 4 Drawing Figures

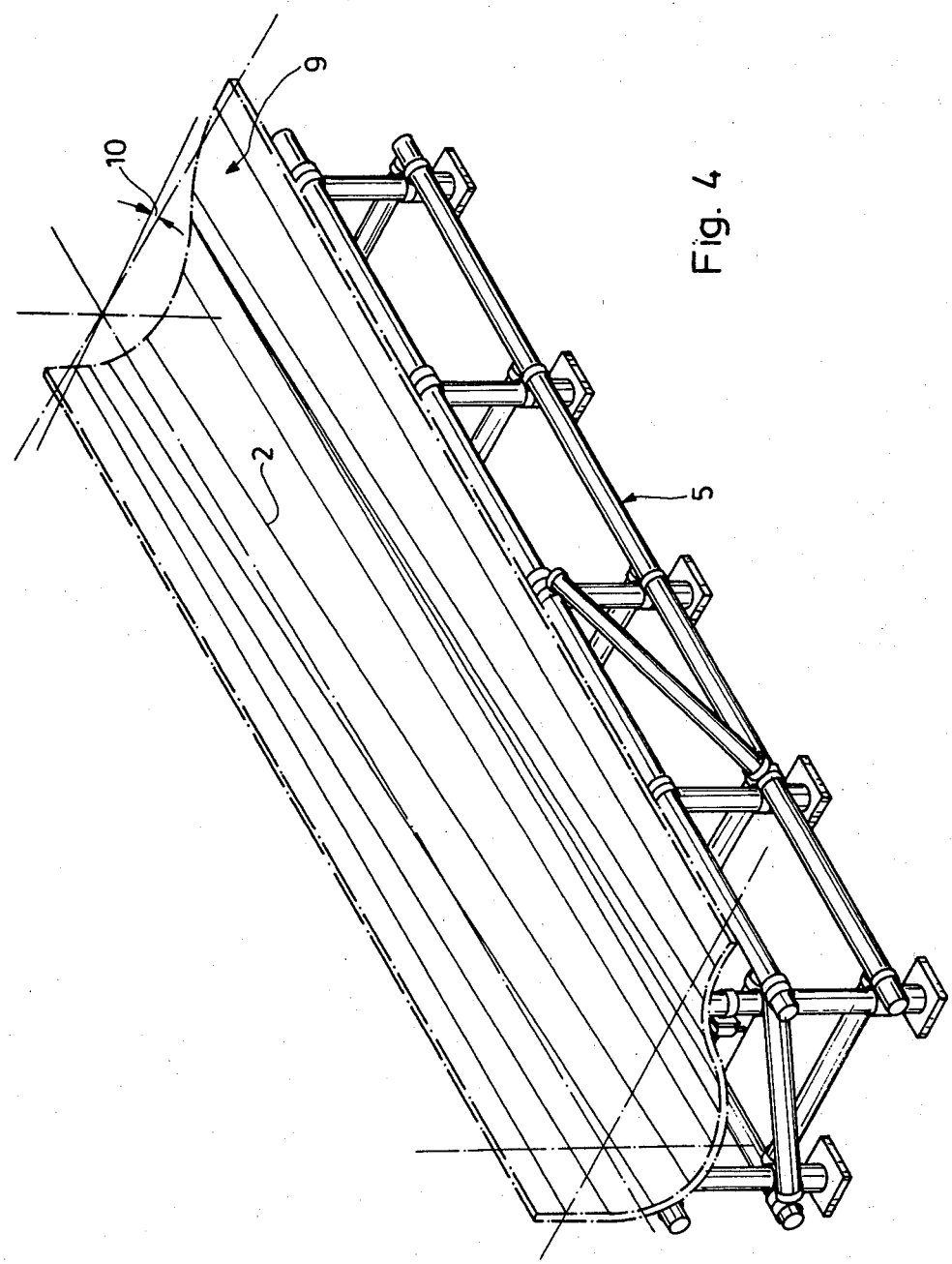

MOLD HALF FOR LAMINATED PARTS

The present invention relates generally to molding apparatus and, more particularly, to a mold half, and specifically a laminating mold half, which is utilized for parts to be molded from fiber components. The mold half of the invention is formed with an inside surface matching the negative contour of the part to be molded therein and the invention also relates to a method for the manufacture of such mold halves.

In order to produce laminated parts, such as for example wings for gliders, from fiber compounds, molds which are made of plastic are utilized. When such molds are used for the manufacture of large sized parts, a cold setting resin system cannot be utilized because of a short dropping time which is involved. However, the process of thermosetting is usually not a practical possibility in plastic molds. It has furthermore been found that the plastic mold surface will be highly stressed by the removal of the molded part from the mold and will require frequent repair. Additionally, production costs of such plastic molds tend to be high.

It is also known to use milled metal molds in order to produce the parts discussed above. Although a thermosetting process is possible in such molds, an expensive heating system is required in order to assure uniform heating of the mold without distortion. The mass of such a mold tends to be very great so that production, transportation, and installation of molds of this type tend to be costly. Moreover, the size of the mold is limited by the capacity of machine tools which are necessary in order to produce such molds.

It is accordingly an aim of the present invention to provide a mold half of the type described whereby the disadvantages of plastic molds and milled metal molds may be overcome and which may be made inexpensively while also being suitable for the manufacture of very large parts, particularly very long parts, and especially those with curved surfaces.

SUMMARY OF THE INVENTION

Briefly, the present invention may be described as molding apparatus comprising a mold half particularly for laminated parts to be molded from fiber components comprising an inside surface matching the negative contour of a part to be molded therein, said mold half being formed of shaped plate material which has been plastically deformed along deformation lines at angles determined by the shape of the part to be molded, and a support member having said mold half fixed thereon and fitting the shape of the deformed material.

In accordance with the present invention, the problems of the prior art are overcome by the mold half of the invention which is formed by a plate shaped material which is plastically deformed along deformation lines at angles which are determined by the shape of the part which is to be molded. The mold half in accordance with the invention offers the advantage that it is extremely simple to produce while essentially conforming to the negative contour of the part which is to be manufactured therein. The mold will resist bending, is twistable, wear resistant, and vacuum tight. It is suited for the manufacture of very long parts because such parts need only be divided in the longitudinal direction. The mold halves corresponding to this division can be fixed in the desired manner so as to be mutually adjacent.

The fastening means of the support may be disposed in adaptation to the deformation of the plate material and to an additional elastic distortion of the material. This has the advantage that, by simple means, a desired twist can be imparted to the part to be produced, which twist need not be taken into account as yet when deformation of the workpiece to adapt it to the basic shape of the part is to be performed. In this manner, items such as, for example, rotor blades may be produced in an extremely simple way with the required twist, with the twist of the mold half being variable at any time as to magnitude and direction of rotation.

The fastening means of the support member are disposed essentially at points, or punctiformly, along two mutually parallel axes, with only a single fastening means being provided to fix the deformed material at a stationary point, with the other fastening means on this axis being deflectable in the direction of the axis while the fastening means on the other axis are deflectable in the latter's direction and transverse thereto.

The advantage of this arrangement is that the mold half may be thermally decoupled from the support and yet the required fixation of the deformed material will be assured even when the twist is taken into account.

It is expedient to form the material blank with the shape of the development resulting from dividing the outline of the part to be produced into sections. Then, the material may be bent along straight lines which connect profile points of the part having the same tangent inclination and including plane surfaces therebetween.

In order to arrive at this relatively quite simple mold half design, the surface of the part to be produced in the mold, e.g., a main wing or a rotor blade, is lofted numerically. The outline is then divided into areas along straight lines connecting profile points of the same tangent inclination. These areas are juxtaposed in the plane development, and separated by the later bending lines. By bending the sheet metal along the bending lines at the angles given as a function of the shape of the part, the actual mold cup may be obtained whose support and fixing means provide for the retention of the constancy of shape, thermal decoupling being possible in the manner described.

It is expedient for the plastically deformable, plate-shaped material to be a sheet metal member.

The mold cup, produced in the manner in accordance with the invention, e.g., of sheet metal, its support and fixing means will together result in a laminating mold half which makes possible the manufacture of very large plastic parts in one procedure with a thermosetting capacity. The mold can be heated, for example, by hot air. When not in use for temporary periods of time, the mold half can be taken apart in a simple manner and it may be stored. If required, components of the mold may be again used in other laminating mold halves.

A mold produced in accordance with the present invention will permit a significant degree of variation in the geometry of the mold with respect to twisting and length. Furthermore, such a mold half will have a rather long useful life particularly when steel sheet is used.

In order to produce mold halves, the plate shaped material is plastically deformed along deformation lines at predetermined angles to attain the negative contour of the part. The material so deformed is affixed to a support member which assures retention of the negative contour.

The elastic distortion may be permanently imparted to the deformed material when it is affixed to the support member. The deformed material may be fixed to the support member in a manner so as to permit thermal expansion. The plate shaped material blank is usually cut in accordance with a development resulting from division of the outline of the part into sections. This material blank is then deformed along straight bending lines which connect profile points of the part having the same tangent inclination.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 4 is a perspective view showing the support member of FIG. 3 with the deformed material affixed thereto.

DETAILED DESCRIPTION OF THE PREFERRED EMBODIMENT

Figure 1:
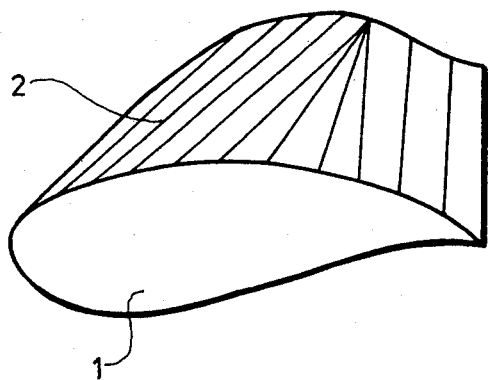
FIG. 1 is a perspective view showing a wing section with straight bending lines.
Figure 2:
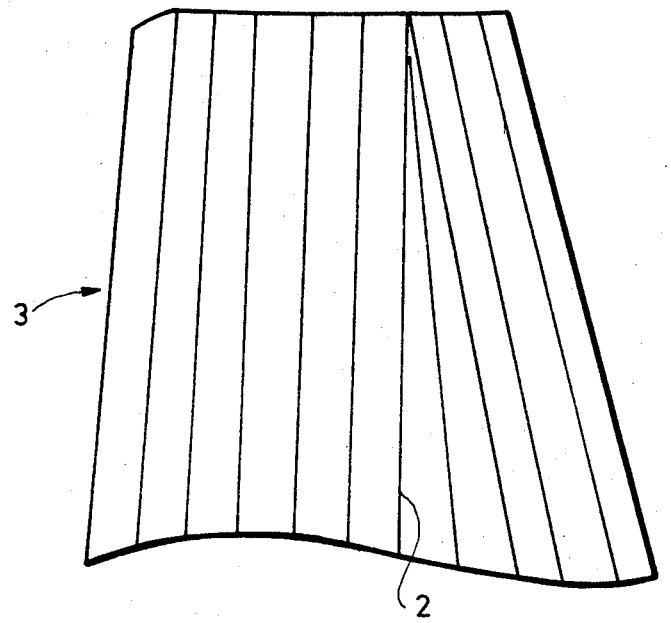
FIG. 2 is a development of the upper portion of the wing section of FIG. 1 shown with the bending lines.

Referring first to FIG. 1 of the drawings, it will be seen that the top of a wing section 1 shown therein is longitudinally divided into sectional parts approximating plane surfaces (the lofting method) by straight lines spaced apart in accordance with the required curvature adaptation. The lines connect profile points of the same tangent inclination. A development 3 of the upper wing half shown in FIG. 1 may be thus obtained, and this development is depicted in FIG. 2. A piece of sheet metal may now be cut to conform to this development and it may be bent along the previously scribed straight bending lines at angles determined as a function of the profile of curvature. A mold cup may thus be obtained and a bottom mold 9 obtained in this fashion is shown in FIG. 4. The bending lines 2 shown in FIG. 2 and the bending lines 2 shown in FIG. 4 completely correspond to each other.

Figure 3:
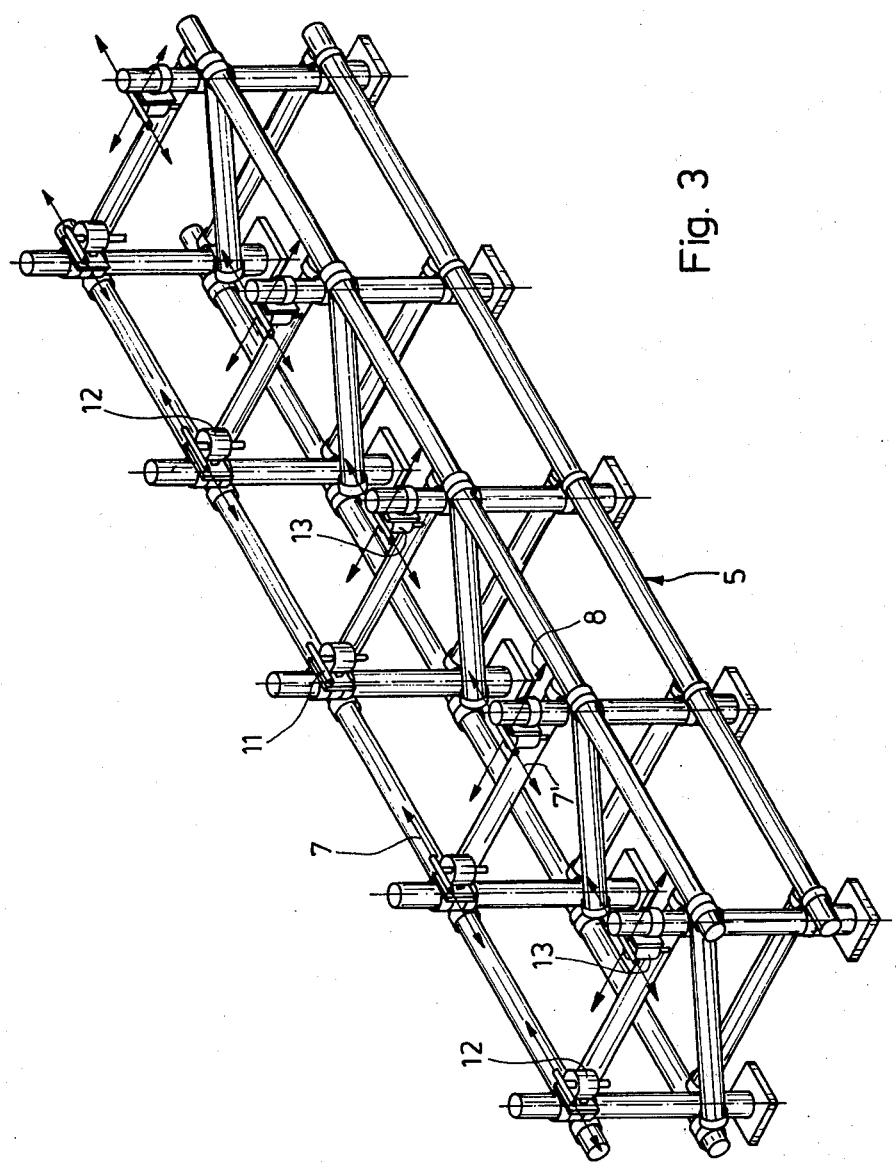
FIG. 3 is a perspective view of an embodiment of a support member for the material deformed along the bending lines and for its fixation with a distortion imparted thereto for thermal decoupling.

The bottom mold 9 shown in FIG. 4 is mounted and affixed onto a support member 5 shown in FIGS. 3 and 4 which is composed of a frame comprising posts and cross members. This mounting and fixing technique is accomplished by fastening means 12 and 13 which are height-adjustable upon and lockable to the frame, the fastening means 12 being disposed on one long side of the support member 5 on an axis extending in the direction of arrows 7. The fastening means 13 are disposed on another long side of the support member 5 in the direction of an axis represented by the arrows 7'.

The bottom mold 9 is affixed to the fastening means 11 mounted on the axis 7 of the fastening means 12 so that relative motion between the bottom mold 9 and the support 5 cannot occur at this point. The fastening means 12 are designed so that relative motion between the support 5 and the bottom mold 9 is possible in the direction of the arrows 7. The fastening means 13 are mounted to the support member 5 so that relative motion between the bottom mold 9 and the fastening means 13 is possible in the direction of the arrows 7' and perpendicular thereto in the direction of the arrows 8, i.e., transverse to the axes.

Due to this fastening technique, the bottom mold 9 is affixed to the support member 5 by means of the fastening means 11 but is thermally decoupled so that free thermal expansion of the bottom mold 9 and hence retention of the profile shape may be assured when thermosetting systems are used in the mold half.

As may be seen from FIG. 4, an elastic deformation or distortion represented by an angle 10 may be imparted to the bottom mold 9 in the longitudinal direction. This distortion is fixed by the fastening means 11, 12, and 13.

While a specific embodiment of the invention has been shown and described in detail to illustrate the application of the inventive principles, it will be understood that the invention may be embodied otherwise without departing from such principles.

What is claimed is:

1. A mold half particularly for laminated parts to be molded from composite fiber materials comprising:
   a unitary sheet member which is produced from a material blank by forming in said material blank a plurality of bends extending along straight lines, said straight line bends in said sheet member defining therebetween adjoining planar surfaces to form said sheet member in conformity with the contour of a part to be molded in a mold formed with said mold half being a part thereof;
   said material blank from which said member is produced being formed from a development of said contour of said part to be molded;
   said straight line bends being arranged to connect points on said contour which have equivalent tangential inclinations and which include plane surfaces therebetween; and
   a support structure having said sheet member supported thereon, said support structure comprising
      first fastening means comprising a single fastening member immovably fixed on said support structure,
      second fastening means comprising a plurality of fastening members located along a first linear axis and arranged to be deflected in directions along said first axis, and
      third fastening means comprising a plurality of fastening members located along a second linear axis parallel to said first linear axis, said fastening members of said third fastening means being arranged to be deflected in directions along said second linear axis as well as in directions transversely thereto,
   said single fastening member of said first fastening means being located along said first linear axis.

2. A mold half according to claim 1 wherein said first, second, and third fastening means are arranged to adapt at the support structure in addition to the deformation at an elastic distortion of the sheet member.

* * * * *